United States Patent
Kumar et al.

(10) Patent No.: US 8,837,479 B1
(45) Date of Patent: Sep. 16, 2014

(54) FAST REROUTE BETWEEN REDUNDANT MULTICAST STREAMS

(75) Inventors: Nitin Kumar, Fremont, CA (US); Nischal Sheth, Los Altos, CA (US); Satish Ramachandran, Santa Clara, CA (US); Robert Kebler, Newburyport, MA (US); Maciek Konstantynowicz, Haddenham (GB)

(73) Assignee: Juniper Networks, Inc., Sunnyvale, CA (US)

( * ) Notice: Subject to any disclaimer, the term of this patent is extended or adjusted under 35 U.S.C. 154(b) by 95 days.

(21) Appl. No.: 13/533,967

(22) Filed: Jun. 27, 2012

(51) Int. Cl.
*H04L 12/24* (2006.01)
*H04L 12/28* (2006.01)

(52) U.S. Cl.
USPC ............ 370/390; 370/228; 370/230; 370/248

(58) Field of Classification Search
USPC ............................................ 370/390, 395.31
See application file for complete search history.

(56) References Cited

U.S. PATENT DOCUMENTS

| | | | |
|---|---|---|---|
| 5,600,642 | A | 2/1997 | Pauwels et al. |
| 6,374,303 | B1 | 4/2002 | Armitage et al. |
| 6,477,166 | B1 | 11/2002 | Sanzi et al. |
| 6,493,349 | B1 | 12/2002 | Casey |
| 6,501,754 | B1 | 12/2002 | Ohba et al. |
| 6,553,028 | B1 | 4/2003 | Tang et al. |
| 6,597,703 | B1 | 7/2003 | Li et al. |
| 6,611,528 | B1 | 8/2003 | Farinacci et al. |
| 6,625,773 | B1 | 9/2003 | Boivie et al. |
| 6,731,652 | B2 | 5/2004 | Ramfelt et al. |
| 6,751,218 | B1 | 6/2004 | Hagirahim et al. |
| 6,778,531 | B1 | 8/2004 | Kodialam et al. |
| 6,807,182 | B1 | 10/2004 | Dolphin et al. |
| 6,847,645 | B1 | 1/2005 | Potter et al. |
| 6,879,594 | B1 | 4/2005 | Lee et al. |
| 6,920,503 | B1 | 7/2005 | Nanji et al. |

(Continued)

FOREIGN PATENT DOCUMENTS

| | | |
|---|---|---|
| JP | 2005130258 A | 5/2005 |
| JP | 2005167482 A | 6/2005 |

(Continued)

OTHER PUBLICATIONS

Pan et al., "Fast Reroute Extensions to RSVP-TE for LSP Tunnels," RFC 4090, May 2005, 36 pp.

(Continued)

*Primary Examiner* — Edan Orgad
*Assistant Examiner* — Emmanuel Maglo
(74) *Attorney, Agent, or Firm* — Shumaker & Sieffert, P.A.

(57) ABSTRACT

A packet-forwarding integrated circuit includes a control logic module and a selector block configured to produce a value indicating an incoming interface associated with a multicast data stream that meets stream health requirements, wherein the multicast data stream is one of a plurality of redundant multicast data streams each received on different incoming interfaces, wherein based on the value produced by the selector block the control logic module outputs data packets of the multicast data stream that meets stream health requirements received on the incoming interface, and discards data packets of other multicast data streams received on other incoming interfaces not indicated by the selector block. In response to detecting that a quality of one of the redundant multicast data streams has fallen below a configured threshold, the control logic automatically rewrites the selector block to forward a different one of the redundant multicast data streams.

19 Claims, 5 Drawing Sheets

(56) References Cited

U.S. PATENT DOCUMENTS

| | | | |
|---|---|---|---|
| 6,976,154 | B1 | 12/2005 | Dyckerhoff et al. |
| 7,035,226 | B2 | 4/2006 | Enoki et al. |
| 7,039,687 | B1 | 5/2006 | Jamieson et al. |
| 7,082,102 | B1 | 7/2006 | Wright |
| 7,133,928 | B2 | 11/2006 | McCanne |
| 7,184,437 | B1 | 2/2007 | Cole et al. |
| 7,251,218 | B2 | 7/2007 | Jorgensen |
| 7,269,135 | B2 | 9/2007 | Frick et al. |
| 7,281,058 | B1 | 10/2007 | Shepherd et al. |
| 7,289,505 | B2 * | 10/2007 | Sanchez et al. ............... 370/393 |
| 7,304,955 | B2 * | 12/2007 | Lee ............... 370/237 |
| 7,330,468 | B1 | 2/2008 | Tse-Au |
| 7,333,491 | B2 | 2/2008 | Chen et al. |
| 7,359,328 | B1 | 4/2008 | Allan |
| 7,360,084 | B1 | 4/2008 | Hardjono |
| 7,366,894 | B1 | 4/2008 | Kalimuthu et al. |
| 7,418,003 | B1 | 8/2008 | Alvarez et al. |
| 7,463,591 | B1 | 12/2008 | Kompella et al. |
| 7,477,642 | B2 | 1/2009 | Aggarwal et al. |
| 7,483,439 | B2 | 1/2009 | Shepherd et al. |
| 7,519,010 | B1 | 4/2009 | Aggarwal et al. |
| 7,522,599 | B1 | 4/2009 | Aggarwal et al. |
| 7,522,600 | B1 | 4/2009 | Aggarwal et al. |
| 7,532,624 | B2 | 5/2009 | Ikegami et al. |
| 7,545,735 | B1 | 6/2009 | Shabtay et al. |
| 7,558,199 | B1 | 7/2009 | Minei et al. |
| 7,558,219 | B1 | 7/2009 | Aggarwal et al. |
| 7,558,263 | B1 | 7/2009 | Aggarwal et al. |
| 7,564,803 | B1 | 7/2009 | Minei et al. |
| 7,564,806 | B1 | 7/2009 | Aggarwal et al. |
| 7,567,512 | B1 | 7/2009 | Minei et al. |
| 7,570,604 | B1 | 8/2009 | Aggarwal et al. |
| 7,570,605 | B1 | 8/2009 | Aggarwal et al. |
| 7,590,115 | B1 | 9/2009 | Aggarwal et al. |
| 7,602,702 | B1 | 10/2009 | Aggarwal |
| 7,606,235 | B1 | 10/2009 | Ayyangar et al. |
| 7,742,482 | B1 | 6/2010 | Aggarwal |
| 7,787,380 | B1 | 8/2010 | Aggarwal et al. |
| 7,826,348 | B2 * | 11/2010 | Farinacci et al. ............. 370/228 |
| 7,830,787 | B1 | 11/2010 | Wijnands et al. |
| 7,839,862 | B1 | 11/2010 | Aggarwal |
| 7,860,104 | B1 | 12/2010 | Aggarwal |
| 7,933,267 | B1 | 4/2011 | Aggarwal et al. |
| 7,936,780 | B1 | 5/2011 | Kompella |
| 7,940,698 | B1 | 5/2011 | Minei et al. |
| 7,957,386 | B1 | 6/2011 | Aggarwal et al. |
| 7,983,261 | B1 | 7/2011 | Aggarwal et al. |
| 7,990,963 | B1 | 8/2011 | Aggarwal et al. |
| 7,990,965 | B1 | 8/2011 | Aggarwal et al. |
| 8,014,317 | B1 * | 9/2011 | Ghosh et al. ............. 370/254 |
| 8,068,492 | B1 | 11/2011 | Aggarwal et al. |
| 8,077,726 | B1 * | 12/2011 | Kumar et al. ............. 370/395.31 |
| 2002/0071390 | A1 | 6/2002 | Reeves et al. |
| 2002/0109879 | A1 | 8/2002 | Wing So |
| 2002/0118644 | A1 | 8/2002 | Moir |
| 2002/0181477 | A1 | 12/2002 | Mo et al. |
| 2002/0186664 | A1 | 12/2002 | Gibson et al. |
| 2002/0191584 | A1 | 12/2002 | Korus et al. |
| 2003/0012215 | A1 | 1/2003 | Novaes |
| 2003/0021282 | A1 | 1/2003 | Hospodor |
| 2003/0031175 | A1 | 2/2003 | Hayashi et al. |
| 2003/0043772 | A1 | 3/2003 | Mathis et al. |
| 2003/0063591 | A1 | 4/2003 | Leung et al. |
| 2003/0087653 | A1 | 5/2003 | Leung et al. |
| 2003/0088696 | A1 | 5/2003 | McCanne |
| 2003/0099218 | A1 | 5/2003 | Tillotson |
| 2003/0099235 | A1 | 5/2003 | Shin et al. |
| 2003/0108047 | A1 | 6/2003 | Mackiewich et al. |
| 2003/0112748 | A1 | 6/2003 | Puppa et al. |
| 2003/0123446 | A1 | 7/2003 | Muirhead et al. |
| 2003/0172114 | A1 | 9/2003 | Leung |
| 2003/0177221 | A1 | 9/2003 | Ould-Brahim et al. |
| 2003/0210705 | A1 | 11/2003 | Seddigh et al. |
| 2003/0223402 | A1 * | 12/2003 | Sanchez et al. ............. 370/351 |
| 2004/0037279 | A1 | 2/2004 | Zelig et al. |
| 2004/0042406 | A1 | 3/2004 | Wu et al. |
| 2004/0047342 | A1 | 3/2004 | Gavish et al. |
| 2004/0081154 | A1 | 4/2004 | Kouvelas |
| 2004/0151180 | A1 | 8/2004 | Hu et al. |
| 2004/0151181 | A1 | 8/2004 | Chu et al. |
| 2004/0165600 | A1 | 8/2004 | Lee |
| 2004/0190517 | A1 | 9/2004 | Gupta et al. |
| 2004/0190542 | A1 * | 9/2004 | Ono et al. ............. 370/432 |
| 2004/0213160 | A1 | 10/2004 | Regan et al. |
| 2004/0218536 | A1 | 11/2004 | Yasukawa et al. |
| 2004/0240446 | A1 | 12/2004 | Compton et al. |
| 2005/0001720 | A1 | 1/2005 | Mason et al. |
| 2005/0013295 | A1 | 1/2005 | Regan et al. |
| 2005/0018693 | A1 | 1/2005 | Dull |
| 2005/0025156 | A1 | 2/2005 | Smathers |
| 2005/0027782 | A1 | 2/2005 | Jalan et al. |
| 2005/0097203 | A1 | 5/2005 | Unbehagen et al. |
| 2005/0108419 | A1 | 5/2005 | Eubanks |
| 2005/0111351 | A1 | 5/2005 | Shen |
| 2005/0129001 | A1 | 6/2005 | Backman et al. |
| 2005/0169270 | A1 | 8/2005 | Mutou et al. |
| 2005/0220132 | A1 | 10/2005 | Oman et al. |
| 2005/0232193 | A1 | 10/2005 | Jorgensen |
| 2005/0262232 | A1 | 11/2005 | Cuervo et al. |
| 2005/0265308 | A1 | 12/2005 | Barbir et al. |
| 2005/0271035 | A1 | 12/2005 | Cohen et al. |
| 2005/0271036 | A1 | 12/2005 | Cohen et al. |
| 2005/0281192 | A1 | 12/2005 | Nadeau et al. |
| 2006/0013141 | A1 | 1/2006 | Mutoh et al. |
| 2006/0039364 | A1 | 2/2006 | Wright |
| 2006/0047851 | A1 | 3/2006 | Voit et al. |
| 2006/0088031 | A1 | 4/2006 | Nalawade |
| 2006/0126496 | A1 * | 6/2006 | Filsfils et al. ............. 370/216 |
| 2006/0147204 | A1 | 7/2006 | Yasukawa et al. |
| 2006/0153067 | A1 | 7/2006 | Vasseur et al. |
| 2006/0164975 | A1 | 7/2006 | Filsfils et al. |
| 2006/0182034 | A1 | 8/2006 | Klinker et al. |
| 2006/0221958 | A1 | 10/2006 | Wijnands et al. |
| 2007/0036162 | A1 | 2/2007 | Tingle et al. |
| 2007/0076709 | A1 | 4/2007 | Mattson et al. |
| 2007/0098003 | A1 | 5/2007 | Boers et al. |
| 2007/0104119 | A1 | 5/2007 | Sarkar et al. |
| 2007/0124454 | A1 | 5/2007 | Watkinson |
| 2007/0140107 | A1 | 6/2007 | Eckert et al. |
| 2008/0044181 | A1 | 2/2008 | Sindhu |
| 2008/0056258 | A1 | 3/2008 | Sharma et al. |
| 2008/0123524 | A1 | 5/2008 | Vasseur et al. |
| 2008/0123654 | A1 | 5/2008 | Tse-Au |
| 2008/0267078 | A1 * | 10/2008 | Farinacci et al. ............. 370/244 |
| 2008/0291921 | A1 | 11/2008 | Du et al. |
| 2009/0028149 | A1 | 1/2009 | Yasukawa et al. |
| 2009/0201803 | A1 * | 8/2009 | Filsfils et al. ............. 370/222 |
| 2009/0245248 | A1 * | 10/2009 | Arberg et al. ............. 370/390 |
| 2010/0296517 | A1 | 11/2010 | Kompella |

FOREIGN PATENT DOCUMENTS

| | | |
|---|---|---|
| JP | 2005252385 A | 9/2005 |
| KR | 2004001206 | 1/2004 |
| WO | 02/091670 A2 | 11/2002 |
| WO | 2004/071032 A1 | 8/2004 |

OTHER PUBLICATIONS

Awduche et al., RFC 3209, "RSVP-TE: Extensions to RSVP for LSP Tunnels," Network Working Group, Dec. 2001, 57 pgs.

Awduche et al., "RSVP-TE: Extensions to RSVP for LSP Tunnels," IETF, Dec. 2001, pp. 1-57.

RSVP-TE: Resource Reservation Protocol—Traffic Extension, Javvin Company, 2 pgs, printed Apr. 18, 2005. http://www.javvin.com/protocolRSVPTE.html.

Zhang, "A Destination-initiated Multicast Routing Protocol for Shortest Path Tree Constructions," GLOBECOM 2003, IEEE Global Telecommunications Conference, XP010677629, pp. 2840-2844.

Rosen et al., "Multicast in MPLS/BGP IP VPNs," draft-rosen-vpn-mcast-07.txt, May 2004, 27 pgs.

(56) References Cited

OTHER PUBLICATIONS

Deering et al., "Protocol Independent Multicast-Sparse Mode (PIM-SM): Motivation and Architecture," draft-ietf-idmr-pim-arch-05.txt, Aug. 4, 1998, 30 pgs.

Martini et al., "Transport of Layer 2 Frames Over MPLS," Network Working Group Internet Draft, draft-martini-l2circuit-trans-mpls-08.txt, Nov. 2001, 18 pgs.

Martini et al., "Encapsulation Methods for Transport of Layer 2 Frames Over IP and MPLS Networks," Network Working Group Internet Draft, draft-martini-l2circuit-encap-mpls-04.txt, Nov. 2001, 17 pgs.

Aggarwal et al., "MPLS Upstream Label Assignment and Context Specific Label Space," Network Working Group Internet Draft, draft-raggarwa-mpls-upstream-label-00.txt, Jan. 2005, 9 pp.

Wijnands et al., "Multicast Extensions for LDP," Network Working Group Internet Draft, draft-wijnands-mpls-ldp-mcast-ext-00.txt, Mar. 2005, 13 pp.

Aggarwal et al., "Establishing Point to Multipoint MPLS TE LSPs," IETF, Aug. 2004, 15 pp.

Yasukawa et al., "Requirements for Point to Multipoint extension to RSVP-TE," IETF Oct. 2003, pp. 1-20.

Atlas et al., "MPLS RSVP-TE Interoperability for Local Protection/Fast Reroute," IETF, Jul. 2001, pp. 1-14.

Le Roux et al., "Fast Reroute in MPLS L3VPN networks Towards CE-to-CE Protection," www.mpls2006.com, 2006, 24 pgs.

Satyanarayana et al., "Extensions to GMPLS RSVP Graceful Restart", draft-aruns-ccamp-restart-ext-01.txt, Jul. 2004, Network Working Group Internet Draft, 23 pp.

Aggarwal et al., "MPLS Upstream Label Assignment for RSVP-TE and LDP," Aug. 24, 2005, http://www.tla-group.com/~mpls/ietf-63-mpls-upstream-rsvp-1dp.ppt, 8 pgs.

Karan et al., "Multicast only Fast Re-Route", draft-karan-mofrr-01, Mar. 13, 2011, Network Working Group, Internet Draft, 14 pp.

U.S. Appl. No. 11/213,640 by Rahul Aggarwal, filed Aug. 26, 2005.
U.S. Appl. No. 12/497,078 by Rahul Aggarwal, filed Jul. 2, 2009.
U.S. Appl. No. 12/497,939 by Rahul Aggarwal, filed Jul. 6, 2009.
U.S. Appl. No. 12/574,428, by Rahul Aggarwal, filed Oct. 6, 2009.
U.S. Appl. No. 12/871,784, by Rahul Aggarwal, filed Aug. 30, 2010.
U.S. Appl. No. 12/972,197, by Rahul Aggarwal, filed Dec. 17, 2010.
U.S. Appl. No. 12/951,885, by Rahul Aggarwal, filed Nov. 22, 2010.
U.S. Appl. No. 12/391,859, by Nitin Kumar, filed Feb. 24, 2009.
U.S. Appl.No. 12/425,503, by Hannes Gredler, filed Apr. 17, 2009.
U.S. Appl. No. 13/315,119, by Nitin Kumar, filed Dec. 8, 2011.

* cited by examiner

FAST REROUTE BETWEEN REDUNDANT MULTICAST STREAMS

TECHNICAL FIELD

The disclosure relates to packet-based computer networks and, more particularly, to forwarding packets within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

In some instances, these packets may be directed to a single destination device in a type of communication referred to as a "unicast" communication. Many applications make use of unicast communications, such as web browsers that communicate via the HyperText Transfer Protocol (HTTP). Unicast communications (or "unicasting"), however, may not be appropriate for all applications, especially those that deliver substantially the same content at substantially the same time to a plurality of destination devices, such as Internet Protocol Television (IPTV), web-conferencing, video conferencing, and other multi-user applications. For these multi-user applications, the use of unicast communications would require delivery of the same content multiple times, i.e., a separate transmission for each destination device, which would unnecessarily consume network bandwidth and strain server resources. As a result, a form of communication referred to as "multicast" communication or "multicasting" was developed to address this unnecessary consumption of network resources.

Multicasting may involve using network devices to replicate data packets for receipt by multiple recipients and thereby reduce the transmission burden on the sender, leading to scalability and more efficient packet delivery. A sender of multicast communication transmits multicast packets to a single address, the multicast group address. Recipients may request to "join" the multicast group in accordance with a protocol, such as the Internet Group Management Protocol (IGMP). If the request is granted, packets sent to the group address are replicated by the network devices of the network and forwarded to the address of the joined recipient, along with all other previously joined recipients.

Multicast live-live techniques allow routers to use multicast techniques, such as join requests, to set up multiple redundant multicast streams across a network to improve robustness of content delivery in case of failures in the network. A receiving router receives multicast data packets on both a primary multicast forwarding path and a secondary multicast forwarding path. The receiving router forwards a primary one of the redundant multicast streams to the next-hop router, while dropping packets of a secondary one of the redundant multicast streams.

SUMMARY

In general, techniques are described for reducing a delay experienced when a router switches between forwarding a primary multicast stream to forwarding a redundant secondary multicast stream. That is, the techniques described herein enable a router to detect, in forwarding plane hardware, a need to switch between forwarding the primary multicast stream to forwarding the redundant secondary multicast stream. The techniques also enable the router to efficiently update forwarding information base (FIB) entries to effectively switch to forwarding the secondary multicast stream rather than the primary multicast stream. Providing these detection and switchover functions in forwarding plane hardware of the router allow for a fast switch between forwarding the primary multicast stream to forwarding the redundant secondary multicast stream.

In one example, the forwarding plane hardware of the router can analyze the quality of incoming redundant packet streams, and upon detecting that an incoming packet stream has a low quality, can quickly update hardware-based selectors associated with entries of the hardware FIB to allow the forwarding plane to promptly begin forwarding a different one of the redundant packet streams.

The techniques described herein may provide one or more advantages. For example, the techniques described herein may allow decreased packet loss compared to other approaches, thereby decreasing an impact of network failures or congestion felt by an end user and improving the end user's experience. The techniques may avoid the need for control plane signaling or other software-based solutions that may entirely rewrite or otherwise reprogram FIB entries within forwarding component application-specific integrated circuits (ASICs) of the router in order to switch to forwarding a redundant secondary packet stream, and may allow for improved responsiveness to network failures or congestion. The techniques allow multicast fast reroute switchover to be implemented efficiently, e.g., less than 50 milliseconds, so that the end receivers have a good quality of experience for their video applications, which is typically delivered over a multicast infrastructure.

In one example aspect, a method includes receiving, with a network device, a primary multicast stream and a secondary multicast stream, wherein the primary multicast stream and the secondary multicast stream are redundant multicast streams received over disjoint multicast forwarding paths, applying a hardware-based analyzer in a forwarding plane of the network device to detect when a quality of one of the primary multicast stream or the secondary multicast stream has fallen below a threshold, and in response to detecting that a quality of one of the primary multicast stream or the secondary multicast stream has fallen below a threshold, and selecting, with a hardware-based monitor block of the forwarding plane of the network device, a different one of the primary multicast stream or the secondary multicast stream having a quality that meets the threshold. The method also includes forwarding packets received on the selected one of the primary multicast stream or the secondary multicast stream, and discarding packets of the multicast stream received on the other one of the primary multicast stream or the secondary multicast stream for which the quality has fallen below the threshold.

In another example aspect, a routing device includes a forwarding component comprising a general-purpose processor, and a packet-forwarding integrated circuit comprising a control logic module and a hardware-based selector block configured to produce a value indicating an incoming interface associated with a multicast data stream that satisfies a quality threshold. The multicast data stream is one of a plurality of redundant multicast data streams each received on different incoming interfaces. Based on the value produced by the selector block the control logic module outputs data packets of the multicast data stream that meets stream health requirements received on the incoming interface, and discards data packets of other multicast data streams received on other incoming interfaces not indicated by the selector block. The forwarding component also includes a memory to store a hardware version of a forwarding information base (FIB), the hardware version of the FIB including a plurality of entries addressable by the packet-forwarding integrated circuit, wherein each of the entries is associated with different packet header key data, and identifies one or more forwarding next hops for forwarding data packets matching the respective entry, wherein each of the entries identifies a list of incoming interfaces of the network device and identifies the selector block to produce a value indicating which of the incoming interfaces of the list is an expected incoming interface on which packets matching the corresponding entry of the hardware version of the FIB are expected to be received. The selector block is configured to, in response to the control logic module addressing one of the entries of the hardware version of the FIB, produce one of the incoming interfaces of the list associated with the addressed entry as the expected incoming interface for the entry based at least on the value produced by the selector block. The forwarding component also includes a hardware-based monitor block that, in response to detecting that a quality of one of the redundant multicast data streams received on the expected incoming interface has fallen below the quality threshold, automatically rewrites the associated selector block in the hardware version of the FIB to produce a value indicating that an incoming interface associated with a different one of the redundant multicast data streams is the expected incoming interface.

In another example aspect, a computer-readable storage medium includes instructions for causing a programmable processor to receive a primary multicast stream and a secondary multicast stream, wherein the primary multicast stream and the secondary multicast stream are redundant multicast streams received over disjoint multicast forwarding paths, and apply a hardware-based analyzer in a forwarding plane of the network device to detect when a quality of one of the primary multicast stream or the secondary multicast stream has fallen below a threshold. The computer-readable storage medium also includes instructions to, in response to detecting that a quality of one of the primary multicast stream or the secondary multicast stream has fallen below a threshold, apply a hardware-based monitor block of the forwarding plane to select a different one of the primary multicast stream or the secondary multicast stream having a quality that meets the threshold, and to forward packets received on the selected one of the primary multicast stream or the secondary multicast stream, and to discard packets of the multicast stream received on the other one of the primary multicast stream or the secondary multicast stream for which the quality has fallen below the threshold.

In yet another example aspect, a packet-forwarding integrated circuit includes a hardware-based analyzer to detect when a quality of one of a primary multicast stream and a secondary multicast stream has fallen below a threshold, wherein the primary multicast stream and the secondary multicast stream are redundant multicast streams received over disjoint multicast forwarding paths. The packet-forwarding integrated circuit also includes a hardware-based monitor block of the forwarding plane of the network device to, in response to detecting that a quality of one of the primary multicast stream or the secondary multicast stream has fallen below a threshold, select a different one of the primary multicast stream or the secondary multicast stream having a quality that meets the threshold. The packet-forwarding integrated circuit forwards packets received on the selected one of the primary multicast stream or the secondary multicast stream, and discards packets of the multicast stream received on the other one of the primary multicast stream or the secondary multicast stream for which the quality has fallen below the threshold.

In a further example aspect, a routing device includes one or more interfaces to receive a primary multicast stream and a secondary multicast stream, wherein the primary multicast stream and the secondary multicast stream are redundant multicast streams received over disjoint multicast forwarding paths, a forwarding component comprising a general-purpose processor, and a packet-forwarding integrated circuit. The packet-forwarding integrated circlet includes a hardware-based analyzer to detect when a quality of one of the primary multicast stream or the secondary multicast stream has fallen below a threshold. The hardware-based monitor block of the forwarding plane of the network device to, in response to detecting that a quality of one of the primary multicast stream or the secondary multicast stream has fallen below a threshold, select a different one of the primary multicast stream or the secondary multicast stream having a quality that meets the threshold. The packet-forwarding integrated circuit forwards packets received on the selected one of the primary multicast stream or the secondary multicast stream, and discards packets of the multicast stream received on the other one of the primary multicast stream or the secondary multicast stream for which the quality has fallen below the threshold.

The details of one or more aspects of this disclosure are set forth in the accompanying drawings and the description below. Other features, objects, and advantages will be apparent from the description and drawings, and from the claims.

DETAILED DESCRIPTION

Figure 1:
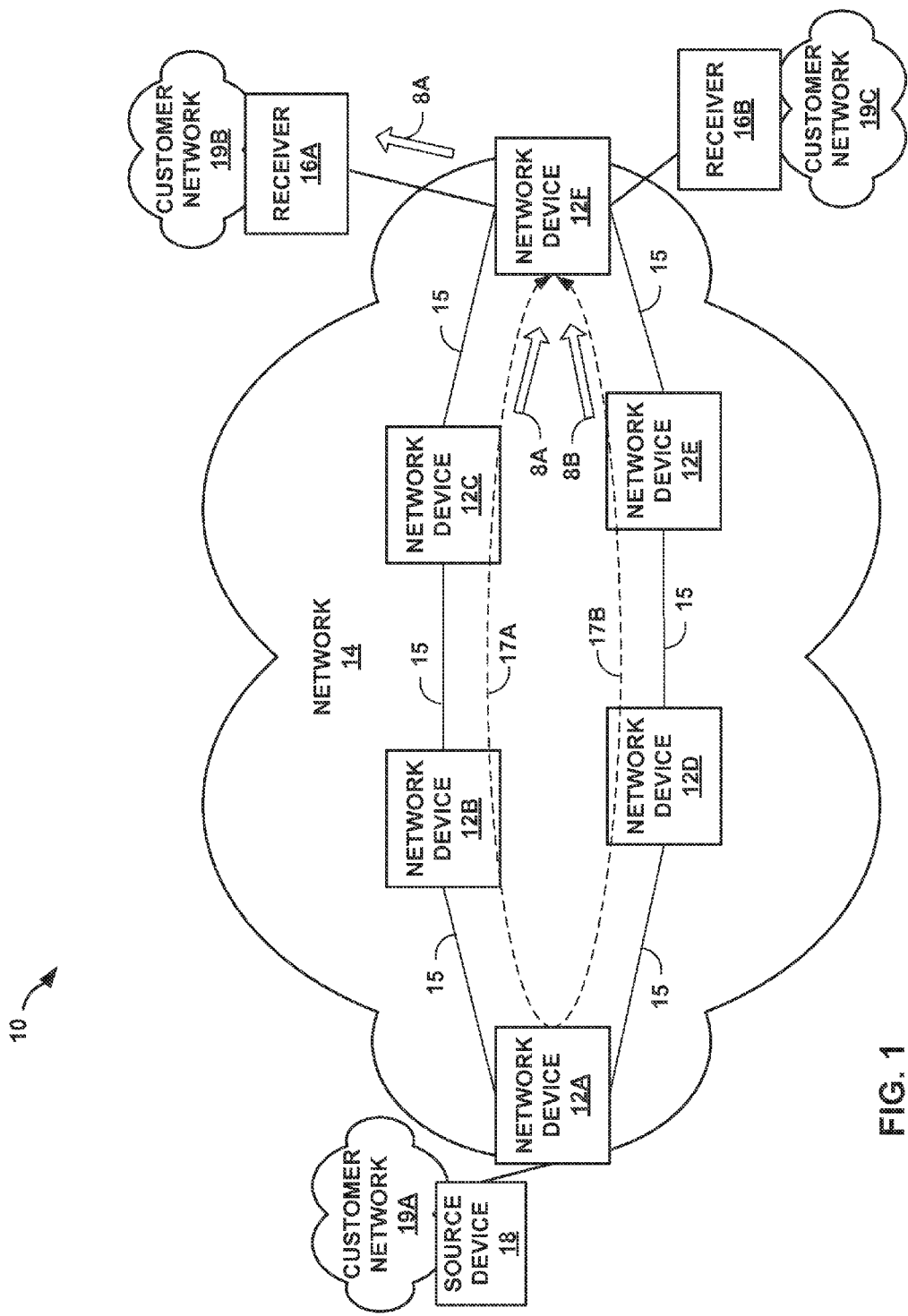
FIG. 1 is a block diagram illustrating an example system in which network devices are configured to forward network traffic in accordance with the techniques described in this disclosure.

FIG. 1 is a block diagram illustrating an example system 10 in which network devices 12A-12F ("network devices 12") of network 14 are configured to forward network traffic (e.g., network packets) in accordance with the techniques described in this disclosure. In the illustrated example of FIG. 1, network devices 12A and 12F may be edge routers of network 14, which may be administered by a network service provider, and provide connectivity for customer networks 19A-19C ("customer networks 19"). Edge routers 12A and 12F may be coupled to customer edge (CE) routers (not shown) of customer networks 19 via access links Edge routers 12A and 12F communicate with CE routers to provide source device 18 and receiver devices 16A-16B of customer networks 19 with access to network 14.

As shown, each of customer networks 19 may be a network for a site of an enterprise. Each of customer networks 19 may include one or more computing devices (not shown) in addition to source device 18 and receiver devices 16A-16B, which may be, for example, personal computers, laptop computers, handheld computers, workstations, servers, switches, printers, or other devices. Network 14 may be a service provider network coupled to one or more networks administered by other service providers, and may thus form part of a large-scale public network infrastructure, e.g., the Internet. Consequently, customer networks 19 may be viewed as edge networks of the Internet. The service provider may provide computing devices within customer networks 19 with access to the Internet via network 14, which allows computing devices within one of customer networks 19 to communicate with computing devices within the Internet or the other one of customer networks 19. FIG. 1 may be a simplified view of network 14. Network 14 may include a variety of other network devices (not shown), such as routers, switches, servers, and the like and may be connected to other networks.

In this example, network devices 12A-12F are connected to one another by physical links 15. The physical links 15 may be a physical medium, such as a copper wire, a coaxial cable, any of a host of different fiber optic lines, or a wireless connection. Network 14 may be traffic-engineered to include multiple multicast forwarding paths 17A-17B ("multicast forwarding paths 17") for controlling the flow of traffic through network 14. For example, a primary multicast forwarding path 17A and a secondary multicast forwarding path 17B are established between network device 12A and network device 12F, where primary multicast forwarding path 17A and secondary multicast forwarding path 17B are disjoint paths through network 14 (i.e., do not traverse common nodes or links). For example, routers 12 may use a multicast protocol such as Protocol Independent Multicast (PIM), or multicast source discovery protocol (MSDP) to output multicast join requests along two or more disjoint multicast forwarding paths toward network device 12A to establish a plurality of multicast forwarding paths, including primary multicast forwarding path 17A and secondary multicast forwarding path 17B (FIG. 1). As another example, routers 12 may use multicast label distribution protocol (mLDP) to establish the multicast forwarding paths 17. In some examples, formation of multicast forwarding paths 17 is initiated by network device 12F, or by network device 12A.

Network device 12A may receive a single multicast stream from source device 18, and may output redundant copies of the multicast stream as primary multicast stream 8A over primary multicast forwarding path 17A, and secondary multicast stream 8B over secondary multicast forwarding path 17B. Network device 12F receives a primary multicast stream 8A over primary multicast forwarding path 17A, and receives a secondary multicast stream 8B over secondary multicast forwarding path 17B. Primary multicast stream 8A and secondary multicast stream 8B are redundant multicast streams, i.e., include identical content. For example, multicast streams 8A-8B may include video content from source device 18 requested by receiver 16A of customer network 19B. In some examples, there may be more than two redundant multicast streams flowing along disjoint paths from network device 12A to network device 12B.

In the example of FIG. 1, network device 12F may operate as a topology merge point for delivering one of the redundant multicast streams 8A-8B to receivers 16A and/or 16B. In one example, network device 12F uses PIM join/prune messages to set up primary multicast forwarding path 17A and secondary multicast forwarding path 17B by establishing a primary and secondary reverse path forwarding (RPF) interface on each network device 12 that receives a PIM join. An example operation of a topology merge point is described in Multicast Only Fast Re-route are described in A. Karan, "Multicast Only Fast Re-Route," Internet-Draft, draft-karan-mofrr-01, March 2011, the entire contents of which are incorporated by reference herein. Network 14 may be considered a topology with a primary plane and a secondary plane that are fully disjoint from each other. Such a dual-planed topology may in some cases be referred to as "multicast live-live."

In the example of FIG. 1, multicast fast reroute techniques allow network device 12F to receive multiple redundant multicast streams from a source, and forward only a primary one of the redundant multicast streams to the next-hop device, e.g., receiver 16A, while dropping packets of the backup redundant multicast stream. When a multicast packet enters an interface of one of network devices 12, such as network device 12F, network device 12F determines whether the source IP address is consistent with networks that are known to be reachable via that input interface, i.e., network device 12F checks the reverse path of the packet (does an "RPF check"). If network device 12F finds a matching routing entry for the source IP of the multicast packet, the RPF check passes and network device 12F forwards the packet to all outgoing interfaces that are participating in multicast for this multicast group. If the RPF check fails, network device 12F drops the packet. RPF checks allow network device 12F to forward only packets that are received on an interface that is associated with the routing entry for the source of the packet, thus breaking any data loop that may exist. Network device 12F receives data packets from the primary and secondary forwarding paths 17. Network device 12F does an RPF check on the received data packets, and forwards packets received on the primary RPF interface that pass the RPF check, and discards redundant packets received on the secondary RPF interface due to an RPF check failure.

Network device 12F utilizes a hardware-based scheme to monitor rates of packets received over the incoming interfaces, as described below, and may detect that a degradation of a quality of the primary stream by detecting that a rate of packets received over primary multicast forwarding path 17A has dropped below a threshold packet rate. When network device 12F detects a degradation on the primary multicast forwarding path below a quality threshold, a forwarding plane of network device 12F can trigger a fast reroute repair in the forwarding plane to automatically select and forward the secondary redundant multicast stream to the next-hop router, and discard packets of the primary redundant multicast stream. In some cases, none of the links 15 that are coupled directly to network device 12F have failed, but a failure or merely congestion may have occurred somewhere upstream of network device 12F along one of multicast forwarding paths 17. Even though a failure of a directly coupled link has not occurred, network device 12F can nonetheless trigger a switch from to forwarding primary multicast stream 8A to forwarding secondary multicast stream 8B when network device 12F detects that a rate of packets received over primary multicast forwarding path 17A has dropped below a threshold packet rate.

In accordance with the techniques described herein, network device 12F may store forwarding information in which entries for multicast routes are each represented as pointers to RPF lists of alternate RPF interfaces for performing RPF checks. The routes may also point to outgoing interface (OIF) lists of one or more OIFs for next-hops to which to forward network packets matching the multicast routes. Specifically, network device 12F may include one or more forwarding components, e.g., packet-forwarding engines, having packet-forwarding ICs for high-speed switching and forwarding of network packets based on keying information extracted from headers of the packets. The keying information may include, for example, a multicast source address, an MPLS label stack, destination addresses, or other information. A control-plane of network device 12F maintains routing information to reflect the topology of network 14 processes the routing information to select routes to the various destinations, and generates a forwarding information base (FIB), such as a database or series of tables or other data structures, that map packet keying information to RPF interfaces, and next-hops and corresponding output interfaces of the router. The control plane of network device 12F configures the forwarding ASIC of its packet-forwarding engine by programming the ASICs with a hardware-based copy of the FIB.

Network device 12F programs a hardware-based copy of the FIB into an application-specific integrated circuit (ASIC) of a forwarding component of the router. In accordance with the techniques of this disclosure, entries of the hardware FIB for multicast routes may internally point to an RPF list that includes at least a primary RPF interface and a secondary RPF interface as elements of the RPF list for that entry. In general, the primary RPF interface is the incoming interface on which primary multicast stream 8A is received, and the secondary RPF interface is the incoming interface on which secondary multicast stream 8B is received. In addition, entries of the hardware FIB can be associated with a corresponding selector block within the ASIC, where the selector block is electrically controlled to output a value that refers to a corresponding element of the RPF list for that entry. Example techniques for using a selector block in a hardware FIB are described by U.S. Pat. No. 8,077,726, entitled "Fast Reroute for Multiple Label Switched Paths Sharing a Single Interface," issued Dec. 13, 2011, the entire contents of which are incorporated by reference herein.

For example, the selector block may be written by a monitor block that is part of forwarding ASICs within a forwarding component of network device 12F that monitors a health of incoming packet streams associated with the selector block, and writes a corresponding value to the selector block based detected changes to the health of the packet streams. The selector block provides an output value that effectively indicates to a forwarding component of a line card of network device 12F which redundant packet streams received on which interface to forward to associated next hops, i.e., packets received either the primary interface or the secondary interface. Entries within the hardware FIB that correspond to packet streams associated with the same interface are programmatically mapped within the ASIC to the internal selector block. Upon detecting that a packet rate has dropped to a level indicating a failure or congestion has occurred somewhere upstream along the forwarding path, the monitor block of the forwarding engine reprograms the selector block of the ASIC to reflect the stream health change, thereby automatically causing the output value of the selector block to change so that the forwarding ASICs automatically forwards the secondary redundant multicast stream 8B to the OIF list outgoing interfaces instead of the primary redundant multicast stream 8A.

For example, entries of the hardware-based FIB within the ASICs may be configured to include a pointer to a data structure defining the RPF list, where the data structure specifies (1) an incoming interface (IIF) for the primary RPF interface and OIF list of outgoing interface(s) to which to send the packet stream, and (2) an incoming interface for the secondary RPF interface and a corresponding OIF list of outgoing interface(s) to which to send the packet stream. The OIF lists associated with the different elements may be the same. The IIFs and the OIFs may be logical interfaces that may or may not map to a physical interface, such as a physical interface port.

Network device 12F may be configured with one or more analyzers, each associated with a different incoming logical interface on which an inbound packet stream is received. In particular, the analyzers are logical constructs that can be dynamically programmed into a portion of ASICs of a forwarding plane of network device 12F, and may be programmed with an associated rate. The analyzers analyze the quality of incoming streams relative to the programmed rate, and may record the quality of incoming streams to a stream health table, which is then inspected by a monitor block of the ASICs. In some examples, the analyzers may be implemented as inverse "policers" that rate a stream as having "good" or "bad" quality depending on the observed rate of the stream. For example, the analyzers may leverage support of the hardware ASIC for "policers" which are normally used as bandwidth limiting filters applied within the forwarding ASIC of the network device. However, network device 12F may utilize a special type of policer, referred to herein as an "inverse policer," which does not limit bandwidth on a physical or logical interface to a threshold but rather determines whether the bandwidth exceeds a defined threshold.

The monitor block updates the selector blocks based on inspection of the stream health table. The monitor block monitors the status or health of incoming redundant multicast streams, such as by inspecting the stream health table, and programs the selector blocks to reflect which of the redundant multicast streams has a packet rate above a threshold. If more than one of a plurality of redundant multicast streams is above a configured threshold, the monitor block may be configured to default to selecting the primary multicast stream to as the redundant stream to forward.

In some aspects, where several different multicast streams are running over a single multicast forwarding path coming in to network device 12F on a single physical link 15, the control plane of network device 12F can program the ASIC to internally map the different addressable hardware FIB entries associated with the different multicast streams to a single selector block (i.e., the same selector block circuitry) that is associated with that particular multicast forwarding path and physical link 15. If the forwarding path should experience some congestion or failure condition, the monitor block within network device 12F need only rewrite the value in the programmable memory of that particular selector block within the ASIC to reflect the link failure so as to cause traffic of each of the multicast streams to be dropped, and different redundant multicast streams to be forwarded instead, without having to individually rewrite each next hop in the hardware FIB or otherwise reprogram or reconfigure the hardware FIB. Therefore, upon failure or congestion along a forwarding path through network 14, the amount of time necessary to achieve multicast fast reroute can be significantly reduced and, moreover, is independent of the number of different multicast streams running over the same forwarding path that need to be dropped in favor of their redundant counterparts. This may allow for improved service and scalability when a large number of multicast streams are running over a single forwarding path and incoming interface and physical communication link.

The configuration of the network environment illustrated in FIG. 1 is merely exemplary. For example, service provider network 14 may include any number of provider edge routers coupled to one or more customer networks. Nonetheless, for ease of description, only customer networks 19A-19C are illustrated in FIG. 1. As another example, network device 12F may receive a greater number of redundant multicast streams than shown in FIG. 1.

Although described for purposes of example in terms of multicast fast reroute, the techniques of this disclosure may be used in other situations. For example, the techniques described herein for fast switchover between primary and secondary redundant data streams may be applied in contexts other than multicast, such as redundant unicast streams, including where unicast RPF methods are used.

Figure 2:
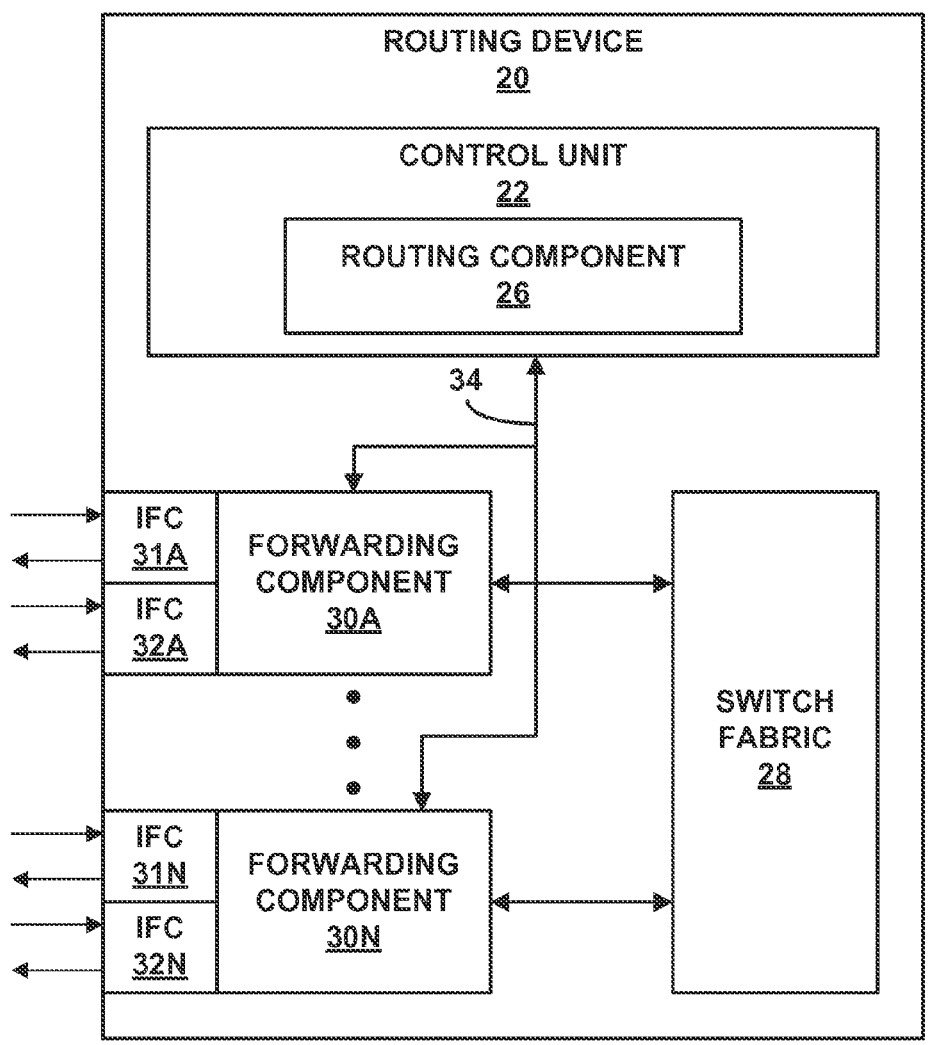
FIG. 2 is a block diagram illustrating an example embodiment of a routing device consistent with the techniques described in this disclosure.

FIG. 2 is a block diagram illustrating an example routing device 20 that creates forwarding structures to be installed in a forwarding plane of routing device 20 in accordance with the principles described herein. Routing device 20 may comprise a router such as one of network devices 12 of FIG. 1, a core router, or other network device. In this example, routing device 20 includes a control unit 22 that includes a routing component 26 that provides control plane functionality for routing device 20. Routing device 20 also includes a plurality of forwarding components 30A-30N ("forwarding components 30") and a switch fabric 28 that collectively provide a data plane for forwarding network traffic. Forwarding components 30 receive and send data packets via interface cards 31A-31N ("IFCs 31") and IFCs 32A-32N ("IFCs 32"). IFCs 31 are physical interface cards. In other embodiments, each of forwarding components 30 may comprise more or fewer IFCs. Although not shown, forwarding components 30 may each comprise a central processing unit (CPU) and a memory. Switch fabric 28 provides a high-speed interconnect for forwarding incoming data packets to the correct one of forwarding components 30 for transmission over a network. U.S. Patent Application 2008/0044181, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference.

Routing component 26 provides control plane functions for storing network topology in the form of routing tables or other structures, executing routing protocols to communicate with peer routing devices and maintain and update the routing tables, and providing a management interface to allow user access and configuration of routing device 20. Control unit 22 provides an operating environment for routing component 26 and may be implemented solely in software, or hardware, or may be implemented as a combination of software, hardware or firmware. For example, control unit 22 may include one or more processors which execute software instructions. In that case, routing component 26 may include various software modules or daemons (e.g., one or more routing protocol processes, user interfaces and the like), and control unit 22 may include a computer-readable storage medium, such as computer memory or hard disk, for storing executable instructions.

Routing component 26 is connected to each of forwarding components 30 by a dedicated internal communication link 34. For example, dedicated link 34 may comprise a 200 Mbps Ethernet connection. Routing component 26 maintains routing information that describes a topology of a network, and derives a forwarding information base (FIB) in accordance with the routing information. In general, the routing information represents the overall topology of the network. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF). In contrast, the FIB is generated based on selection of certain routes within the network and maps packet key information (e.g., destination information and other select information from a packet header) to one or more specific next hops and ultimately to one or more specific output interfaces (e.g., physical interface ports) of IFCs 31, 32. Routing component 26 may generate the FIB in the form of a radix tree having leaf nodes that represent destinations within the network. U.S. Pat. No. 7,184,437 provides details on an exemplary embodiment of a router that utilizes a radix tree for route resolution, the contents of which is incorporated herein by reference in its entirety.

Routing component 26 communicates data representative of a software copy of the FIB into each of forwarding components 30 to control forwarding of traffic within the data plane. This allows the software FIB stored in memory (e.g., RAM) of in each of forwarding components 30 to be updated without degrading packet-forwarding performance of routing device 20. In some instances, routing component 26 may derive separate and different software FIBs for each respective forwarding components 30. In addition, one or more of forwarding components 30 include application-specific integrated circuits (ASICs) (not shown) that forwarding components 30 program with a hardware-copy of the FIB based on the software FIBs (i.e., hardware versions of the software FIBs) copied to each respective forwarding component 30.

As described herein, the hardware FIBs within the forwarding ASICs are dynamically programmed by a microprocessor on forwarding components 30 to include entries that each include a pointer to internal structures within the ASICs, where each of those structures are programmed to store multicast fast reroute data that specifies (1) an RPF list having at least (a) an incoming interface associated with a primary multicast forwarding path, and (b) an incoming interface associated with a secondary multicast forwarding path, and (2) a list of one or more forwarding next hops to which to forward packets matching the entry of the FIB, e.g., an outgoing interface (OIF) list. The RPF list may include more than two incoming interfaces. For example, there may be more than two redundant multicast data streams, each being received on a different incoming interface.

In addition, the microprocessor within each forwarding component 30 programs entries in the hardware FIB so as to associate the entries with one of a plurality of selector blocks within the ASIC, where each selector block includes circuitry configured to reflect which incoming interface is the RPF interface for the entry. If failure or congestion along a primary multicast forwarding path is detected, such as by detecting that a rate of packets received on a primary incoming interface has fallen below a threshold, a hardware-based monitor block of the forwarding component coupled to the IFC 31 associated with the primary incoming interface reprograms the selector block of the ASIC (e.g., by rewriting a value within addressable memory in the selector block) to reflect the failure or congestion.

After the selector block is reprogrammed, the forwarding plane of routing device 20 automatically forwards the traffic received on the secondary multicast forwarding path to the indicated next hops, which traffic was formerly being discarded by the forwarding component. After the selector block is reprogrammed, the forwarding plane of routing device 20 also then discards any traffic received on the primary multicast forwarding path, based on the reprogrammed selector block. In this way, the techniques allow for multicast fast reroute capabilities carried out in data plane hardware while avoiding any requirement that forwarding components 30 and/or routing component 26 individually rewrite each next hop in the hardware FIB and/or regenerate the FIB at all.

Figure 3:
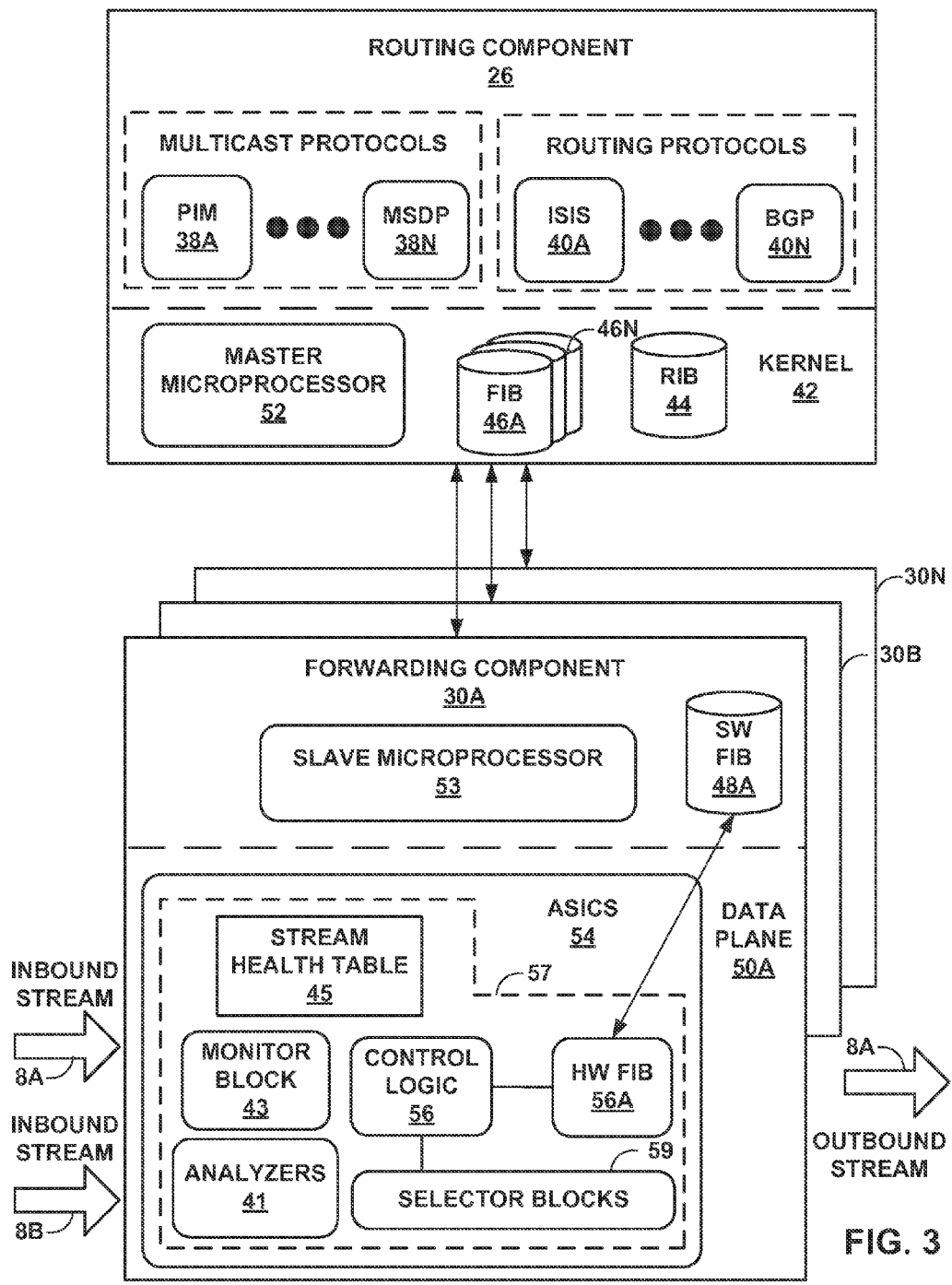
FIG. 3 is a block diagram illustrating a routing component and a forwarding component of the routing device of FIG. 2 in further detail.

FIG. 3 is a block diagram illustrating a routing component and a forwarding component of the routing device 20 of FIG. 2 in further detail. Routing device 20 may be a router such as any of routers 12 of FIG. 1. For example, routing device 20 may be a topology merge point router that can apply multicast fast reroute techniques. Routing device 20 can implement fast failover from forwarding a primary redundant multicast stream to a forwarding a secondary redundant multicast stream using the techniques of this disclosure.

Routing component 26 may include various protocols 38A-38N, such as Protocol Independent Multicast (PIM) 38A and multicast source discovery protocol (MSDP) 38N. In some examples, routing device 20 may include only one of PIM 38A and MSDP 38N, or may not include either. PIM 38A and MSDP 38N may be used in establishing a primary multicast forwarding path 17A and a secondary multicast forwarding path 17B between network device 12A and network device 12F within network 14. For example, routing device 20 may use PIM 38A to output multicast join requests along two or more disjoint multicast forwarding paths toward network device 12A to establish a plurality of multicast forwarding paths, including primary multicast forwarding path 17A and secondary multicast forwarding path 17B (FIG. 1). In other examples, routing device 20 may use a different protocol for establishing multicast forwarding paths for redundant multicast streams, such as mLDP.

Routing component 26 also includes high-level, control plane routing protocols 40A-40N ("routing protocols 40"). In the example of FIG. 3, routing protocols 40 include ISIS 40A and BGP 40N. Routing component 26 may include other protocols and additional routing protocols not shown in FIG. 3. Routing protocols 40 interact with kernel 42 (e.g., by way of API calls) to update routing information base (RIB) 44 based on routing protocol messages received by routing device 20. In response, master microprocessor 52 of kernel 42 generates forwarding information in the form of FIBs 46A-46N based on the network topology represented in RIB 44, i.e., performs route resolution. For example, master microprocessor 52 may determine the physical interface port to be used for forwarding packets to the forwarding next hops. Master microprocessor 52 of kernel 42 then programs forwarding components 30 to install copies of the FIBs as software FIBs 48A-48N.

In this example, ASICs 54 are microcode-controlled chipsets programmably configured by a slave microprocessor 53 executing on each of forwarding components 30A-30N (e.g., forwarding component 30A). Specifically, one or more of ASICs 54 is controllable by microcode 57 programmed by slave microprocessor 53. The slave microprocessor 53 programs a hardware FIB 56A into internal memory of ASICs 54 within the data plane 50A based on software FIB 48A. When forwarding packets, control logic 56 traverses HW FIB 56A and, upon reaching a FIB entry for the packet (e.g., a leaf node), forwarding ASICs 54 automatically forward to forwarding next hop(s) of the entry a single stream from among two or more redundant multicast packet streams based on a value output by one of selector blocks 59 associated with the entry (e.g., the value may be represented by a signal). The values of selector blocks 59 are programmed by monitor block 43 based on the stream health quality. Based on the value output by one of selector blocks 59, ASICs 54 of forwarding component 30A discards the other redundant multicast streams received on other interfaces that are not output as the expected interface by the selector block 59, and does not forward the other redundant multicast streams. In this manner, only one of the redundant multicast streams is forwarded by forwarding component 30A. The interaction between slave microprocessor 53, control logic 56, monitor block 43, and HW FIB 56A is described in further detail below with respect to FIG. 4.

After the ASICs 54 are programmed with HW FIBs 56A-56N (HW FIBs 56B-56N not shown), data planes 50A-50N of routing device 20 may receive inbound traffic including redundant multicast streams received on different incoming interfaces associated with different redundant multicast streams. For example, routing device 20 may receive redundant packets via two or more interfaces of forwarding component 30A. For each received multicast packet, forwarding component 30A references HW FIB 56A using header information of the packet as a key to obtain forwarding next hop(s) for the packet (e.g., an outgoing interface list), and does an RPF check of the interface on which the packet was received, to determine whether to forward the packet out one or more outgoing interfaces associated with a corresponding forwarding next hop. Control logic 56 may do the RPF check, for example.

In the multicast context, for example, forwarding component 30A may use a source IP address as the key for referencing HW FIB 56A. Based on HW FIB 56A and the value of the corresponding selector block, ASICs 54 will perform an RPF check using the RPF interface specified by the element of the RPF list corresponding to the value of output by the selector block, and automatically forward or drop the packet based on the RPF check. In this manner, one of the inbound redundant multicast streams is forwarded and one is dropped. One example of a router including a packet processing engine having multiple microcode instruction memories is described in U.S. Pat. No. 6,976,154, the entire contents of which are incorporated herein by reference.

Analyzers 41 include one or more analyzers, each associated with a different incoming logical interface on which an inbound packet stream is received. Analyzers 41 are blocks programmed into a portion of ASICs 54, and may be programmed with an associated rate. Analyzers 41 analyze the quality of incoming streams relative to the programmed rate, and record the quality of incoming streams to stream health table 45, which is then inspected by monitor block 43.

In some examples, analyzers 41 may be a plurality of inverse policers that rate a stream as having "good" or "bad" quality depending on the observed rate of the stream. Inverse policers are similar to policers, with reversed actions. The inverse policers make a determination of stream quality by measuring a rate of incoming packets on a stream. The inverse policers normalize the quality of a stream to a number, and store the number value to stream health table 45, indexed by a stream identifier. The inverse policers may trigger an event if a data stream has a rate below a configured threshold rate. If the data stream has a rate below a configured threshold rate, the inverse policer deems the stream to be of bad quality.

As one example, the inverse policer implementation may be based on a token bucket scheme (credits). The token bucket is initialized based on the configured rate. As and when packets hit the policer block, tokens are charged. Tokens are credited continuously in the background based on the configured rate. Packets hitting the policer block get classified as in/out of spec depending on the rate. In the example of an inverse policer, if the stream is marked as "in spec," the inverse policer marks the stream as a "bad" quality stream, because the stream is coming at a lesser rate than expected, which means there are likely to be drops occurring upstream of routing device 20.

Stream health table 45 is a summarization of the quality all streams. An identifier (ID) is assigned to each stream, and this ID is used to index in the table. The value of a table entry indicates the quality of the stream. The inverse policer results update this table, as shown below. Monitor block 43 has read access to stream health table 45. Although described for purposes of example as a table, stream health table 45 may be stored in the form of one or more tables, databases, link lists, radix trees, databases, flat files, or any other data structures.

Monitor block 43 updates selector blocks 59 based on inspection of stream health table 45. Monitor block 43 monitors the status or health of incoming redundant multicast streams, and programs the selector blocks 59 to reflect which of the redundant multicast streams has a packet rate above a threshold. If more than one of a plurality of redundant multicast streams is above a configured threshold, monitor block 43 may be configured to default to selecting the primary multicast stream to forward. Monitor block 43 may be one or more hardware threads of ASICs 54.

Monitor block 43 continuously or periodically scans stream health table 45, and detects when stream quality degrades. As one example, monitor block 43 uses inline KeepAlive packet processor engine (PPE) threads to implement the scan. These threads can react in milliseconds to detect a change in stream health table 45. Monitor block 43 threads scan stream health table 45 looking for a good quality value. Once that value is found, the found index is written in the corresponding selector block 59.

That is, upon detecting that quality of a primary data stream has fallen below the configured rate threshold, monitor block 43 reprograms the corresponding selector block 59 to output a value associated with a different data stream having a good quality. This way when the quality value changes, the change will be caught by the scan, and a new value programmed in the selector block 59, causing a new stream to be picked up for forwarding. As a result, when a packet comes in on the primary stream, ASICs 54 do a look up based on the packet header, and now selects the different good quality data stream.

For example, now if multiple streams are being received, ASICs 54 forward only the good quality stream as output by the selector, while dropping the other streams. The stream that survives the selector block will be forwarded to the OIF list of the route. When monitor block 43 detects that the quality of the current stream falls below a threshold, monitor block 43 will update the selector block 59, and this will cause another stream to be picked. Stream switchover is almost instantaneous, as updates are done in the dataplane. Since monitor block 43 and switchover are implemented in ASICs 54, the detection and switchover times can be in the order of milliseconds, and less than 50 milliseconds.

Reverse path forwarding (RPF) checks are enabled by the data plane 50A of routing device 20. In accordance with the techniques of this disclosure, the identity of the RPF interface can be used for triggering the data plane 50A to switch to forwarding the secondary redundant multicast stream upon detecting failures or congestion along the primary multicast forwarding path. Upon detecting a failure or congestion of a network resource on the primary multicast forwarding path, such as by using monitor block 43 and analyzers 41 as described above, monitor block 43 may modify the selector block 59 to change its value to correspond to a different element in the RPF list that is associated with the secondary multicast forwarding path. As one example, upon determining that a packet has not been received on a primary RPF interface of network device 20 within a time period, monitor block 43 may rewrite the selector block 59 to cause the selector block to output a value that indicates that the secondary interface is the RPF interface. Thus, multicast packets received on the secondary multicast forwarding path will be accepted and forwarded as being received on the RPF interface, and multicast packets received on any other multicast forwarding path will be dropped as not being received on the RPF interface. The outgoing interface list may stay the same. Routing device 20 terminates the multicast live-live forwarding by selecting a single redundant stream to forward and discarding packets received on the other redundant stream(s).

In one example, a route node of hardware FIB 56A first points to the monitor block 43 that determines the qualities of the streams. A selector list follows, whose selection table is maintained by the monitoring microcode. The stream that survives the selector block will be forwarded to the OIF list of the route. As and when monitor block 43 detects changes in the qualities of the streams it will update the selector table. Stream switchover is almost instantaneous, as updates will be done in the dataplane. Since monitoring and switchover is implemented in ASICs 54, the failover times are less than 50 milliseconds.

Figure 4:
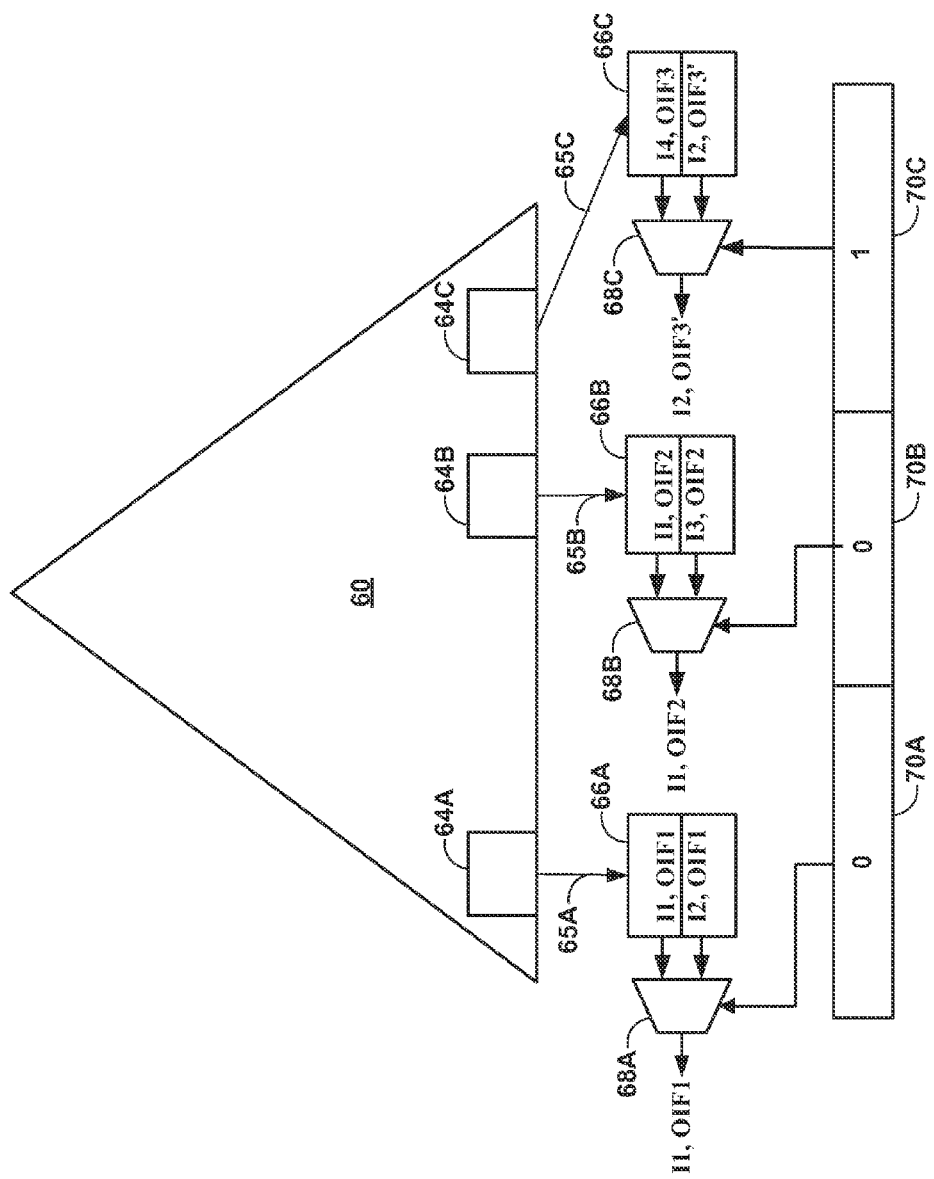
FIG. 4 is a block diagram illustrating a forwarding information base (FIB) maintained by forwarding components.

FIG. 4 is a block diagram illustrating exemplary structures in which a forwarding information base (FIB) 60 is maintained in hardware of an ASIC by a forwarding component of a router such as routers 12A-12D of FIG. 1 and routing device 20 of FIG. 2. In the example of FIG. 4, FIB 60 is arranged as a tree having as entries route resolution leaf nodes 64A-64C ("leaf nodes 64") that resolve forwarding labels to next hops. Specifically, in the embodiment of FIG. 4, leaf nodes 64A-64C include pointers 65A-65C that reference separate data structures that include incoming interface lists 66A-66C ("incoming interface lists 66") having two elements. In other examples, the incoming interface lists 66 may have more than two elements. The incoming interface lists 66 may, in some examples, be RPF lists that specify two or more alternate RPF interfaces.

Pointers 65A-65C may comprise indirect next hop data as described in "Network Routing Using Indirect Next Hop Data," U.S. Application Pub. No. 2010/0296517, filed Jul. 30, 2010, the entire content of which is incorporated herein by reference. The arrangement of FIB 60, or a portion thereof, is illustrated as a tree for exemplary purposes. The principles of this disclosure may readily be applied to other arrangements of FIB 60. FIB 60 may be arranged, for example, as a number of tables, hash tables, link lists, and other data structures.

Upon receiving a packet on an incoming interface at one of forwarding components 30, control logic 56 reads a block of data, referred to as a key, from the packet. The key may, for example, specify a multicast source IP address, a destination address, an MPLS label, or other keying information. Control logic 56 resolves the key to one of the leaf nodes 64 of FIB 60, e.g., leaf node 64A, by sequentially testing bits within the key, e.g., bits A, B and C, that represent any bits within the block of data. Based on the value of each bit, control logic 56 follows the nodes of FIB 60 through the various levels until reaching one of the leaf nodes 64 that provides a match to the key (e.g., a longest prefix match) to identify incoming interface list 66A associated with the key.

Upon identifying a respective leaf node, a pointer 65 directs control logic 56 to one of incoming interface lists 66, e.g., incoming interface list 66A. In the example of FIG. 4, each of the incoming interface lists 66 includes two elements. For example, the two elements may consist of (a) a first element that specifies a primary incoming interface as the RPF interface and an outgoing interface list (OIF list) for the one or more forwarding next hops to which to forward packets received on the primary incoming interface, and (b) a second element that specifies a secondary incoming interface as the RPF interface and an outgoing interface list (OIF list) for the one or more forwarding next hops to which to forward packets received on the primary incoming interface. The OIF lists may be the same for the primary and secondary incoming interfaces, or in some examples the OIF lists may be different. In some examples, the incoming interface lists 66 will only indicate the RPF interface, and may point to another location that separately indicates the OIF list.

For example, leaf node 64A includes a pointer 65 to incoming interface list 66A, which specifies a first element listing a primary incoming interface I1 as the RPF interface, and specifies that packets received on interface I1 when the I1 is the RPF interface should be forwarded to forwarding next hops using OIF list OIF1. Incoming interface list 66A further specifies a second element listing a secondary incoming interface I2 as the RPF interface, and specifies that packets received on interface I2 when the I2 is the RPF interface should be forwarded to forwarding next hops using OIF list OIF1.

The leaf nodes 64 may also include pointers (not shown) to one of selector blocks 70A-70C ("selector blocks 70"). Selector blocks 70 are data memory locations that, in effect, indicate which of the packet streams received on incoming interfaces associated with network device 20 has been selected by monitor block 43 as having the best quality (health).

The selector blocks 70 consist of blocks of memory (e.g., one bit blocks) that indicate whether the primary packet stream associated with the primary interface is meeting certain health requirement(s), such as being above a threshold rate, as detected by monitoring an analyzer configured on the primary interface. In one example, monitor block 43 detects an analyzer event output by analyzers 41 indicating the primary packet stream does not meet the stream health requirements, and updates the appropriate selector block 70 by rewriting the value of the bit(s) stored in the memory space of the selector block 70, which results in a different interface being designated as the RPF interface.

In another example, monitor block 43 scans stream health table 45 continuously or periodically to find a stream having a good quality (e.g., satisfying a configured rate threshold), and monitor block 43 rewrites selector blocks 59 to reflect a value associated with the good quality stream when the current selector block value does not reflect a value associated with a good quality stream. For example, a bit value of "0" may indicate that the primary multicast data stream received on the primary incoming interface is a good quality stream, while a bit value of "1" may indicate that the primary multicast data stream received on the primary incoming interface does not meet the threshold stream health standards, while the secondary multicast data stream received on the secondary incoming interface does meet the threshold stream health standards. The logical values are provided for exemplary purposes, and operation of the selection block may be modified without deviating from the principles of this disclosure. In examples in which there are more than two redundant multicast streams, the incoming interface lists 66 will include more than two elements, i.e., one element for each of the streams, and the selector blocks may consists of blocks of memory greater than one bit.

As shown in FIG. 4, selector block 70A has a value of "0," which specifies primary interface I1 as the RPF interface and indicates that the multicast stream that matches route 64A and associated with the primary interface I1 of incoming interface list 66A is of good quality. Therefore, selector block 70A causes multiplexer 68A to return the primary interface I1 and OIF list OIF1 from incoming interface list 66A. Similarly, selector block 70B also has a value of "0," which specifies primary interface I1 as the RPF interface and indicates that the multicast stream that matches route 64B and associated with the primary interface I1 of incoming interface list 66B is of good quality. Therefore, selector block 70B causes multiplexer 68B to return the primary interface I1 and OIF list OIF2 from incoming interface list 66B.

As shown in FIG. 4, selector block 70C has a value of "1," which indicates that the multicast stream that matches route 64C and associated with the primary interface 14 of incoming interface list 66C is not of good quality, e.g., does not meet the configured heath requirements, while the redundant multicast stream that matches route 64C and associated with the secondary interface I2 of incoming interface list 66C is of good quality. Therefore, selector block 70C causes multiplexer 68C to return the secondary incoming interface I2 as the RPF interface, and OIF list OIF3' as the forwarding next hops for leaf node 64C.

Upon receiving a multicast packet at routing device 20 to be forwarded, control logic 56 accesses HW FIB 60 and traverses the tree of HW FIB 60 to arrive at a leaf node 64 using the source IP address of the multicast packet as a key. Control logic 56 reads the RPF interface selected and output by the corresponding multiplexer 68, performs an RPF check to see whether the incoming interface of the multicast packet matches the specified RPF interface. If the RPF check passes, control logic 56 directs ASICs 54 to forward received multicast packet to the outgoing interfaces specified by the OIF list.

Monitor block 43 monitors the health of the multicast stream associated with each of the incoming interfaces, and detects a change from good quality to bad quality. Upon detecting a change of a stream received on a primary interface to bad quality, monitor block 43 rewrites the bit in the memory block of selector block 70A from "0" to "1", which causes multiplexer 68A to select and output the second element of the RPF list, i.e., [IL OIF1] for incoming interface list 66A. Providing the RPF list and selector functionality in forwarding component hardware avoids the requirement of control plane signaling to entirely rewrite the forwarding next hops in the FIB to begin forwarding multicast traffic of a secondary multicast stream.

Figure 5:
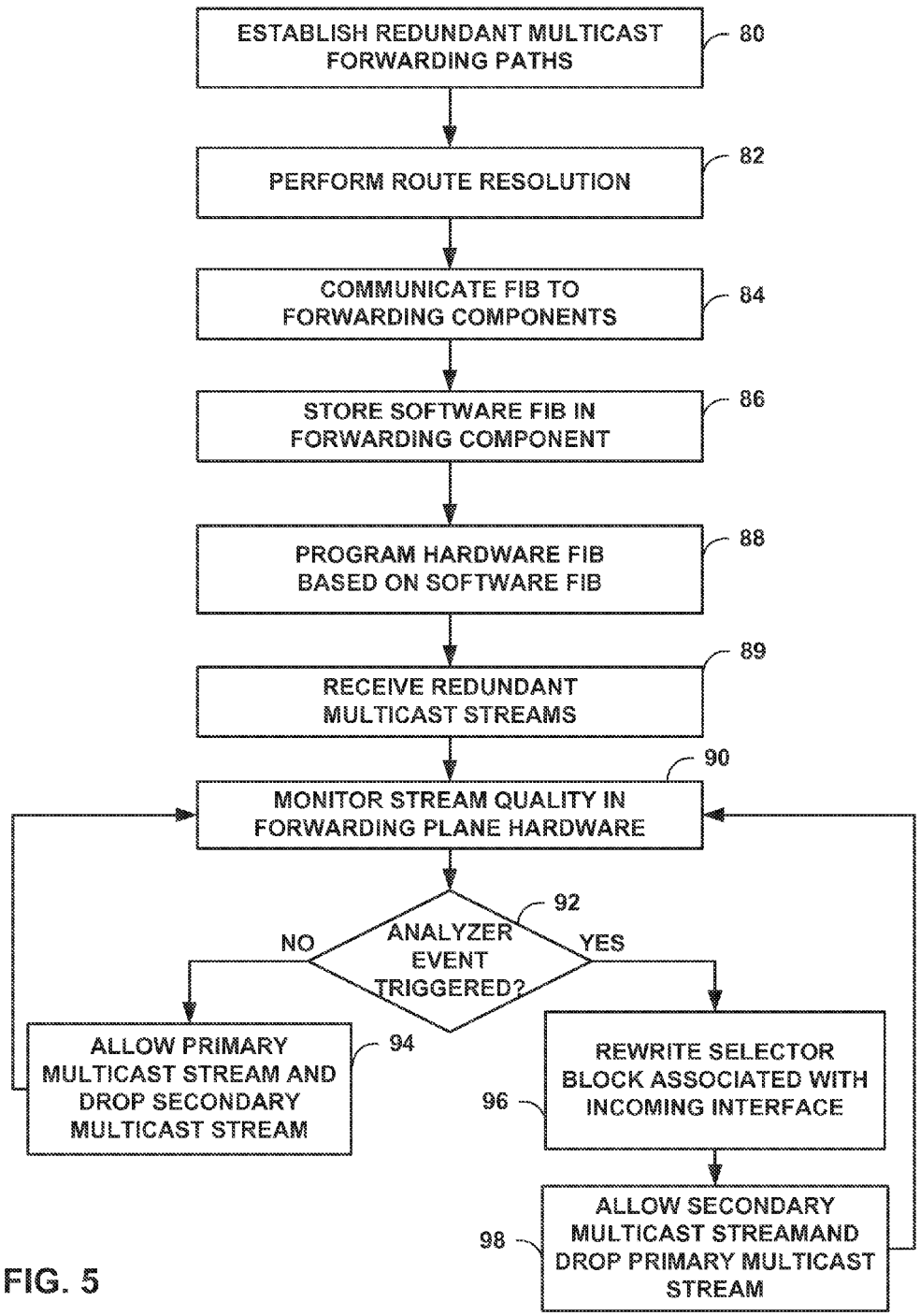
FIG. 5 is a flowchart illustrating example operation of a network device consistent with the techniques described in this disclosure.

FIG. 5 is a flowchart illustrating example operation of a network device such as network device 12F of FIG. 1 or routing device 20 of FIG. 2 consistent with the techniques described in this disclosure. FIG. 5 will be described with reference to FIGS. 1-4. In operation, network device 12F participates in establishing a plurality of redundant multicast forwarding paths within network 14 (80). For example, PIM 38A or MSDP 38N may be used in establishing a primary multicast forwarding path 17A and a secondary multicast forwarding path 17B between network device 12A and network device 12F within network 14.

Routing protocols 40 interact with kernel 42 to update routing information base (RIB) 44 based on routing protocol messages received by routing device 20. In response, master microprocessor 52 of kernel 42 performs route resolution to generate forwarding information in the form of FIBs 46A-46N based on the network topology represented in RIB 44 (82). For example, master microprocessor 52 may determine a physical interface port to be used for outputting packets to the forwarding next hops. Master microprocessor 52 of kernel 42 communicates the FIB to forwarding components 30 (84) by programming the slave microprocessors 53 of forwarding components 30 to install copies of the FIBs as software FIBs 48A-48N (86). A slave microprocessor 53 on each of forwarding components 30A-30N (e.g., forwarding component 30A) programs a hardware FIB 56A of ASICs 54 within the data plane 50A based on software FIB 48A (88). In programming the hardware FIB, the slave microprocessor 53 may by default also program selector blocks 70 so the RPF list associated with each selector block 70 will output the primary incoming interface as the RPF interface.

During operation of the network device, the network device receives a primary multicast stream along the primary multicast forwarding path, and a secondary multicast stream along the secondary multicast forwarding path. The received multicast streams are redundant multicast streams (89). Monitor block 43 on each of the forwarding components 30 monitors the quality of the redundant multicast streams in forwarding plane hardware using analyzers for incoming interfaces associated with each interface of its forwarding component 30 (90). When no analyzer event is triggered (NO branch of 92), the selector block 70 for that link remains set at "0," which causes the primary incoming interfaces to be the RPF interface for all RPF lists associated with that selector block. In this case, when the forwarding component receives packets and control logic 56 traverses the tree to reach an end node 64, the forwarding component 30 does an RPF check using as the RPF interface the element of the RPF list specified by the selector. Based on the RPF check the forwarding component forwards the packet stream received on the primary incoming interface to the indicated next hops, and discards redundant packet streams received for that route on the secondary incoming interface (94). When monitor block 43 detects based on the hardware-based analyzers that a health of an incoming packet stream has dropped below a threshold level (YES branch of 92), monitor block 43 rewrites a selector block 70 associated with the incoming packet stream to reflect a value of "1," which indicates that a secondary redundant packet stream has superior health and should be forwarded instead (96). This automatically causes the forwarding ASICs 54 to drop subsequent packets received on the primary stream due to failed RPF checks, and causes the forwarding ASICs 54 to forward packets received on the secondary redundant stream due to satisfying the RPF check (98). Thus, only a single operation by the monitor block 43 in the data plane hardware is needed in order to carry out multicast fast reroute. Moreover, the multicast fast reroute operation does not need control plane signaling to entirely rewrite hardware FIB entries for this operation. This allows for a faster reroute and more scalability. When the health of the primary multicast stream improves, monitor block 43 may again rewrite the corresponding selector block with "0" to reflect the changed status.

Various examples have been described. These and other examples are within the scope of the following claims.

The invention claimed is:

1. A method comprising:
   receiving, with a network device, a primary multicast stream and a secondary multicast stream, wherein the primary multicast stream and the secondary multicast stream are redundant multicast streams received over disjoint multicast forwarding paths;
   applying a hardware-based analyzer in a forwarding plane of the network device to detect when a quality of the primary multicast stream has fallen below a threshold;
   in response to detecting that the quality of the primary multicast stream has fallen below a threshold and the secondary multicast stream has a quality that meets the threshold and, with a hardware-based monitor block of the forwarding plane of the network device, reprogramming a hardware-based selector block of the forwarding plane to produce a value indicating that an incoming interface on which the secondary multicast stream is received is an expected incoming interface for the redundant multicast streams;
   forwarding packets received on the secondary multicast stream in response to determining that the packets were received on the expected incoming interface output by the selector block; and
   discarding packets of the primary multicast stream for which the quality has fallen below the threshold in response to determining that the packets of the primary multicast stream were not received on the expected incoming interface output by the selector block.

2. The method of claim 1, wherein the expected incoming interface comprises a reverse path forwarding (RPF) interface, further comprising:
   upon receiving a packet, performing an RPF interface check for the entry based at least on the value, wherein the value indicates which of the incoming interfaces is the RPF interface for the entry, to determine whether an interface on which the packet is received is the same as the RPF interface.

3. The method of claim 1, further comprising:
   programming a packet-forwarding integrated circuit in the forwarding plane of the network device to internally store a hardware version of a forwarding information base (FIB), the hardware version of the FIB including a plurality of entries addressable by the packet-forwarding integrated circuit, wherein at least one of the entries identifies a list of incoming interfaces of the network device, wherein the packet-forwarding integrated circuit comprises the selector block, wherein the selector block is configured to produce a value indicating which of the incoming interfaces of the list is an expected incoming interface on which packets matching the corresponding entry of the hardware version of the FIB are expected to be received,
   wherein the selector block is configured to, in response to the control logic module addressing the one of the entries of the hardware version of the FIB, produce one of the incoming interfaces of the list associated with the addressed entry as the expected incoming interface for the entry based at least on the value produced by the selector block.

4. The method of claim 1, wherein applying the hardware-based analyzer comprises applying the hardware-based analyzer to analyze a quality of received packet streams on each of a plurality of incoming interfaces of the network device.

5. The method of claim 1, wherein applying the hardware-based analyzer comprises applying a hardware-based inverse policer in the forwarding plane detect that a packet flow rate of the primary multicast stream has dropped below a configured threshold packet flow rate.

6. The method of claim 1, further comprising:
   storing, by the hardware-based analyzer, an indication of the quality of the received packet streams on each of the incoming interfaces; and
   monitoring, by the hardware-based monitor block, the stored indication of the quality of the received packet streams.

7. The method of claim 3, wherein each of the entries of the hardware FIB is addressable by the packet-forwarding integrated circuit based on a multicast source address of received packets.

8. The method of claim 3, further comprising the selector block switching from producing an incoming interface associated with the primary multicast stream as the expected interface to producing the incoming interface associated with the secondary multicast stream as the expected interface, for those entries in the hardware version of the FIB that correspond to the selector block, without requiring the entries in the hardware version of the FIB to be individually rewritten.

9. The method of claim 3, wherein each of the entries of the hardware version of the FIB also identifies a forwarding next hop to which to forward received packets matching the respective entry, wherein the forwarding next hop comprises a list of outgoing interfaces to which to forward received packets.

10. A routing device comprising:
a forwarding component comprising:
a general-purpose processor; and
a packet-forwarding integrated circuit comprising:
a control logic module;
a hardware-based selector block configured to produce a value indicating an incoming interface associated with a multicast data stream that satisfies a quality threshold,
wherein the multicast data stream is one of a plurality of redundant multicast data streams each received on different incoming interfaces, wherein based on the value produced by the selector block the control logic module outputs data packets of the multicast data stream that meets stream health requirements received on the incoming interface, and discards data packets of other multicast data streams received on other incoming interfaces not indicated by the selector block;
a memory to store a hardware version of a forwarding information base (FIB), the hardware version of the FIB including a plurality of entries addressable by the packet-forwarding integrated circuit, wherein each of the entries is associated with different packet header key data, and identifies one or more forwarding next hops for forwarding data packets matching the respective entry, wherein each of the entries identifies a list of incoming interfaces of the network device and identifies the selector block to produce a value indicating which of the incoming interfaces of the list is an expected incoming interface on which packets matching the corresponding entry of the hardware version of the FIB are expected to be received,
wherein the selector block is configured to, in response to the control logic module addressing one of the entries of the hardware version of the FIB, produce one of the incoming interfaces of the list associated with the addressed entry as the expected incoming interface for the entry based at least on the value produced by the selector block; and
a hardware-based monitor block that, in response to detecting that a quality of one of the redundant multicast data streams received on the expected incoming interface has fallen below the quality threshold, automatically rewrites the associated selector block in the hardware version of the FIB to produce a value indicating that an incoming interface associated with a different one of the redundant multicast data streams is the expected incoming interface.

11. The routing device of claim 10, further comprising:
wherein the packet-forwarding integrated circuit forwards packets received on a primary multicast stream and discards packets received on a secondary multicast stream when the incoming interface of the routing device on which the primary multicast stream is received is the same as the expected interface produced by the selector block, and
wherein the monitor block, in response to detecting that a health of the primary multicast stream has fallen below a configured threshold, automatically rewrites the selector block in the hardware version of the FIB to produce a value indicating that an incoming interface associated with the secondary multicast stream is the expected incoming interface.

12. The routing device of claim 10 wherein the expected incoming interface comprises a reverse path forwarding (RPF) interface, wherein the control logic, upon receiving a packet, performs an RPF check for the entry based at least on the value indicating which of the incoming interfaces is the RPF interface for the entry.

13. The routing device of claim 10, wherein the packet-forwarding integrated circuit further comprises a plurality of hardware-based inverse policers to detect that a packet flow rate of the one of the redundant multicast streams has dropped below a configured threshold packet flow rate.

14. The routing device of claim 10, wherein each of the entries of the hardware version of the FIB also identifies a forwarding next hop to which to forward received packets.

15. The routing device of claim 10, wherein each of the entries of the hardware FIB is addressable by the packet-forwarding integrated circuit based on a multicast source address of received data packets.

16. A non-transitory computer-readable storage medium comprising instructions for causing a programmable processor to:
receive a primary multicast stream and a secondary multicast stream, wherein the primary multicast stream and the secondary multicast stream are redundant multicast streams received over disjoint multicast forwarding paths;
apply a hardware-based analyzer in a forwarding plane of the network device to detect when a quality of the primary multicast stream has fallen below a threshold;
in response to detecting that the quality of the primary multicast stream has fallen below a threshold the secondary multicast stream has a quality that meets the threshold, and, with a hardware-based monitor block of the forwarding plane of the network device, reprogram a hardware block of the forwarding plane to produce a value indicating that an incoming interface on which the secondary multicast stream is received is an expected incoming interface for the redundant multicast streams;
forward packets received on the secondary multicast stream in response to determining that the packets were received on the expected incoming interface output by the selector block; and
discard packets of the primary multicast stream for which the quality has fallen below the threshold in response to determining that the packets of the primary multicast stream were not received on the expected incoming interface output by the selector block.

17. A packet-forwarding integrated circuit comprising:
a hardware-based analyzer to detect when a quality of a primary multicast stream has fallen below a threshold, wherein the primary multicast stream and a secondary multicast stream are redundant multicast streams received over disjoint multicast forwarding paths; and
a hardware-based monitor block of the forwarding plane of the network device to, in response to detecting that the quality of the primary multicast stream has fallen below a threshold and the secondary multicast stream has a quality that meets the threshold reprogram a hardware block of the forwarding plane to produce a value indicating that an incoming interface on which the secondary multicast stream is received is an expected incoming interface for the redundant multicast streams, wherein the packet-forwarding integrated circuit forwards packets received on the secondary multicast stream in response to determining that the packets were received on the expected incoming interface output by the selector block, and discards packets of the multicast stream received on the primary multicast stream for which the quality has fallen below the threshold in response to determining that the packets of the primary multicast stream were not received on the expected incoming interface output by the selector block.

18. A routing device comprising:

one or more interfaces to receive a primary multicast stream and a secondary multicast stream, wherein the primary multicast stream and the secondary multicast stream are redundant multicast streams received over disjoint multicast forwarding paths;

a forwarding component comprising:

a general-purpose processor; and a packet-forwarding integrated circuit comprising:

a hardware-based analyzer to detect when a quality of the primary multicast stream has fallen below a threshold; and a hardware-based monitor block of the forwarding plane of the network device to, in response to detecting that the quality of the primary multicast stream has fallen below a threshold and the secondary multicast stream has a quality that meets the threshold, reprogram a hardware block of the forwarding plane to produce a value indicating that an incoming interface on which the secondary multicast stream is received is an expected incoming interface for the redundant multicast streams;

wherein the packet-forwarding integrated circuit forwards packets received on the secondary multicast stream in response to determining that the packets were received on the expected incoming interface output by the selector block, and discards packets of the multicast stream received on the primary multicast stream for which the quality has fallen below the threshold in response to determining that the packets of the primary multicast stream were not received on the expected incoming interface output by the selector block.

19. The routing device of claim 18, wherein the forwarding component further comprises control logic that programs the packet-forwarding integrated circuit in the forwarding plane of the network device to internally store a hardware version of a forwarding information base (FIB), the hardware version of the FIB including a plurality of entries addressable by the packet-forwarding integrated circuit, wherein at least one of the entries identifies a list of incoming interfaces of the network device, wherein the packet-forwarding integrated circuit comprises the selector block, wherein the selector block is configured to produce a value indicating which of the incoming interfaces of the list is an expected incoming interface on which packets matching the corresponding entry of the hardware version of the FIB are expected to be received, wherein the selector block is configured to, in response to the control logic module addressing the one of the entries of the hardware version of the FIB, produce one of the incoming interfaces of the list associated with the addressed entry as the expected incoming interface for the entry based at least on the value produced by the selector block.

\* \* \* \* \*